US012768406B2

(12) United States Patent
Chandler, Sr.

(10) Patent No.: US 12,768,406 B2
(45) Date of Patent: Oct. 20, 2026

(54) CHANDLER 5 IN 1 LOCOMOTIVE BRAKE SERVICE TOOL

(71) Applicant: Ronny L. Chandler, Sr., Memphis, TN (US)

(72) Inventor: Ronny L. Chandler, Sr., Memphis, TN (US)

( * ) Notice: Subject to any disclaimer, the term of this patent is extended or adjusted under 35 U.S.C. 154(b) by 371 days.

(21) Appl. No.: 18/445,595

(22) Filed: Nov. 8, 2023

(65) Prior Publication Data

US 2025/0146543 A1 May 8, 2025

(51) Int. Cl.
*F16D 65/00* (2006.01)
*B25F 1/00* (2006.01)

(52) U.S. Cl.
CPC .......... *F16D 65/0043* (2013.01); *B25F 1/006* (2013.01)

(58) Field of Classification Search
CPC .. B61H 13/02; B25D 1/14; B25D 1/00; B25F 1/006; F16D 65/0043
USPC ...... 254/10.5, 100, 25, 130, 113, 117; 269/6
See application file for complete search history.

(56) References Cited

U.S. PATENT DOCUMENTS 1,030,660 A * 6/1912 Hunt ........................ B66F 15/00 254/131
1,309,734 A * 7/1919 Hemfling ................ B66F 15/00 D8/89
2,433,139 A 12/1947 Martin
2,491,295 A * 12/1949 Anderson ................ B25D 1/02 81/20
2,525,226 A * 10/1950 Lawellin ................. B25C 11/00 D8/89
2,681,791 A 6/1954 Hahn
2,719,613 A 10/1955 Spann et al.
3,219,316 A * 11/1965 Fried .......................... B25F 1/00 7/166
3,540,698 A 11/1970 Diffenderfer et al.
3,654,689 A 4/1972 Schwarz
3,705,430 A 12/1972 Ziaylek, Jr.
3,752,269 A 8/1973 Touchstone
3,835,969 A 9/1974 Touchstone
3,902,577 A 9/1975 Touchstone
4,063,342 A 12/1977 Mitchell et al.
4,276,684 A 7/1981 Mattson
4,290,583 A * 9/1981 Lombardi ................ B25D 1/04 254/26 R
4,910,820 A * 3/1990 Brinkman ................ B25D 1/04 7/138

(Continued)

FOREIGN PATENT DOCUMENTS

CN 205166784 U 4/2016

OTHER PUBLICATIONS

International Search Report issued in corresponding application No. PCT/US2024/055135, Intellectual Property Office of the Philippines, mailed Feb. 4, 2025, 3 pages.

*Primary Examiner* — Joel D Crandall

(74) *Attorney, Agent, or Firm* — Capitol City TechLaw, PLLC; Samuel P. Burkholder

(57) ABSTRACT

The Chandler 5 IN 1 Locomotive Brake Service Tool has 5 individual tools all in 1 single component can more efficiently and effectively service the brake system with less time consumption. This tool has a right-side fork to remove the pin from the right-side brake shoe and it has a left-side fork to remove the pin from the left-side brake shoe, hammerhead slack adjuster pin removal, punch tip for adjusting slack and prybar for slack pin tab retainer.

10 Claims, 3 Drawing Sheets

(56) References Cited

U.S. PATENT DOCUMENTS 5,003,680 A 4/1991 Vesely et al.
5,095,603 A 3/1992 Carruthers et al.
5,165,154 A 11/1992 Miller
5,237,729 A 8/1993 Martin
5,345,664 A 9/1994 McMahon et al.
5,481,950 A 1/1996 Browning
5,507,083 A 4/1996 Redgrave et al.
5,732,456 A 3/1998 Frey
5,765,416 A 6/1998 Cote
5,765,807 A * 6/1998 Heath ...................... B25D 1/04 254/26 R
5,975,255 A 11/1999 Monroe et al.
6,029,331 A 2/2000 Simmons
6,108,882 A 8/2000 Hodgson
6,182,539 B1 2/2001 Webster
6,298,512 B1 * 10/2001 Hagen ..................... B25B 27/04 81/20
6,347,562 B1 * 2/2002 Gerber, Jr. ............... B25D 1/02 81/25
6,460,210 B1 * 10/2002 Alpert ...................... B25D 1/04 81/20
7,322,084 B2 1/2008 Horsman
7,430,794 B2 10/2008 Steffen, et al.
D598,726 S 8/2009 Higgs
7,676,896 B1 3/2010 Carscadden
8,469,425 B1 6/2013 Lofley, Sr. et al.
8,707,533 B2 4/2014 Livingston et al.
8,826,504 B1 9/2014 Slivon
8,939,051 B1 1/2015 Lofley, Sr. et al.
9,283,664 B2 3/2016 Clemetson et al.
9,308,634 B1 4/2016 Adams
9,371,079 B1 6/2016 Owens
9,377,067 B2 6/2016 Mellberg
D821,841 S 7/2018 Honadel et al.
D850,881 S 6/2019 Wang
D871,174 S 12/2019 Lofley, Sr. et al.
10,800,393 B2 10/2020 Hecker et al.
10,821,956 B2 11/2020 Obal
D922,838 S 6/2021 Lofley, Jr.
11,311,998 B1 4/2022 Lofley, Jr.
D953,836 S 6/2022 Slafkovsky
D963,441 S 9/2022 Lofley, Jr.
11,577,711 B2 2/2023 Ritter et al.
2007/0114501 A1 * 5/2007 Eby ........................ B25D 1/045 254/25
2007/0252117 A1 11/2007 Harpell
2010/0199732 A1 8/2010 Komemi
2010/0237301 A1 9/2010 Eric
2011/0113566 A1 5/2011 Holbrook
2011/0119836 A1 * 5/2011 Tygh ...................... A62B 3/005 7/166
2013/0233121 A1 9/2013 Monroe
2014/0182107 A1 * 7/2014 Nestor .................... B66F 15/00 254/131.5
2016/0052121 A1 * 2/2016 Smith ..................... B66F 15/00 7/146
2019/0186569 A1 6/2019 Abernathy
2021/0061320 A1 3/2021 Parsons et al.
2022/0355836 A1 11/2022 Irwin et al.
2022/0364613 A1 11/2022 Pitt
2023/0330446 A1 10/2023 Allen

* cited by examiner

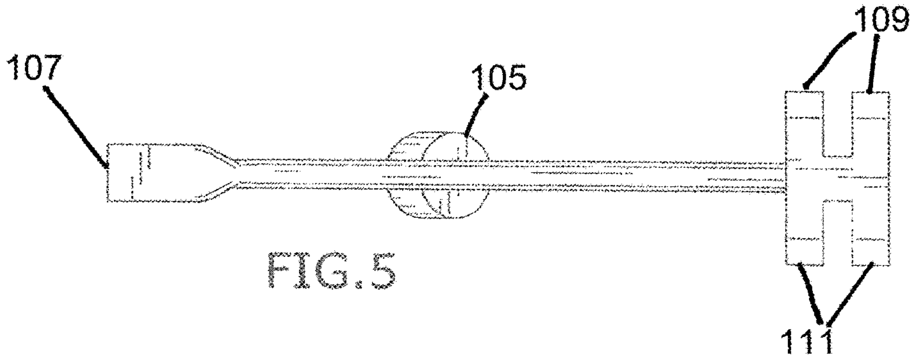
FIG.5
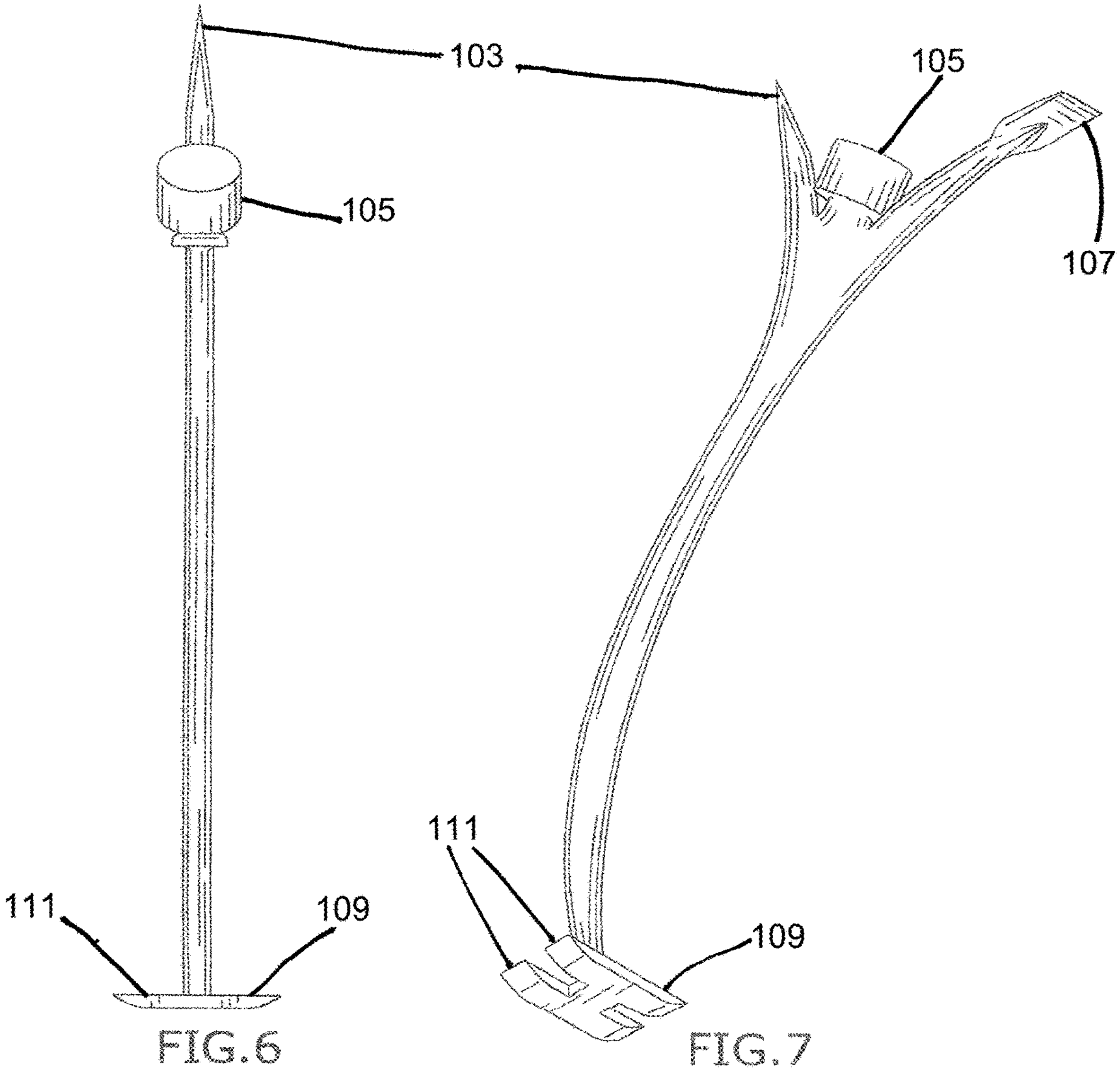
FIG.6
FIG.7

CHANDLER 5 IN 1 LOCOMOTIVE BRAKE SERVICE TOOL

FIELD

The present application relates to the Chandler 5 IN 1 Locomotive Brake Service Tool, to reflect how it is a more useful and improved locomotive brake service tool through its operational elements in providing efficiency in safely changing brakes more effectively and with less time consumption.

BACKGROUND

In earlier years the locomotive brake services effort was extremely limited and not very reliable, relying on limited resources such as a screw and linkage system to apply brake blocks.

As the locomotive industry has continued to evolve over the years as train speeds increased, it became essential to provide a more powerful braking system capable of instant application.

Today, locomotive brake service systems are equipped with sophisticated brake systems that allows more control over the acceleration system and parking, but there is still a need for brake shoe replacements with expedience and accuracy while still meeting the safety requirements needed to stay within regulations.

SUMMARY

By providing the locomotive industry with the Chandler 5 IN 1 Locomotive Brake Service Tool, the elements of this tool are so versatile, that there is no other tool designed with the functionality like this tool on the world market. This tool will safely and efficiently with less time consumption can be used at railroad service yards all over the world. This tool can effectively remove and install all new brake shoes on cover hopper railcars, railroad box cars, open gondola rail cars, hauler cars, tanker cars, flat bed railroad cars and so many more. This tool can set the slack adjuster on any locomotive or on any type of railroad car completely and safely within a short time frame.

This tool will allow any engineer conductor and service track engineer will be able to set the brakes inside the cab of the locomotive, then climb out onto the ground and go to the wheels on the locomotive. Use the air release handle to remove the air pressure from that set of locomotive wheels, then take the tool and with the prybar of the tool, push the brake shoe away from the wheel of the locomotive, then take the prybar and lift the slack adjuster retainer clip so the slack adjuster pin can be pushed out of the slack adjuster rod using the hammer head on the tool.

After the pin is removed there's no pressure on the brake shoe assembly, that's when the claw feet of the tool can grab the metal head of the brake shoe radius retainer pin and pull it out of the brake shoe retainer slot, releasing the brake shoe so it can be removed and a new brake shoe put in its place and the radius brake shoe retainer pin can be pushed back down through the brake shoe retainer holes. The new shoe is now in place to engage the locomotive wheel when air pressure is applied to the air piston. Now the slack adjuster's slack must be taken up, that's where the adjustment pin and the tool take up the slack and aligns the hole in the slack adjuster.

The slack adjuster pin can now be reinstalled and its retainer clip pushed back in place with the prybar part of the tool, the brake pads have now been installed and the air brake valve handle can reapply air pressure to the cylinder. That set of brakes is now installed safely and you can now move on to the next set of brake shoes until all the necessary brake shoes needed are installed on the locomotive.

The chocks can be removed from the wheels and the engineer conductor or service track engineer can climb back up in the locomotive cab and start up the locomotive and release the air brakes and move the engine at will. The brake replacement job is completed using the Chandler 5 IN 1 Locomotive Brake Service Tool.

BRIEF DESCRIPTION OF THE DRAWINGS

In the following present application, you will see a detailed description the drawing embodiments shown.

FIG. 5 is a bottom plan view thereof;

FIG. 6 is a left elevation view thereof; and

FIG. 7 is a bottom rear perspective view thereof.

DETAILED DESCRIPTION

Figure 1:
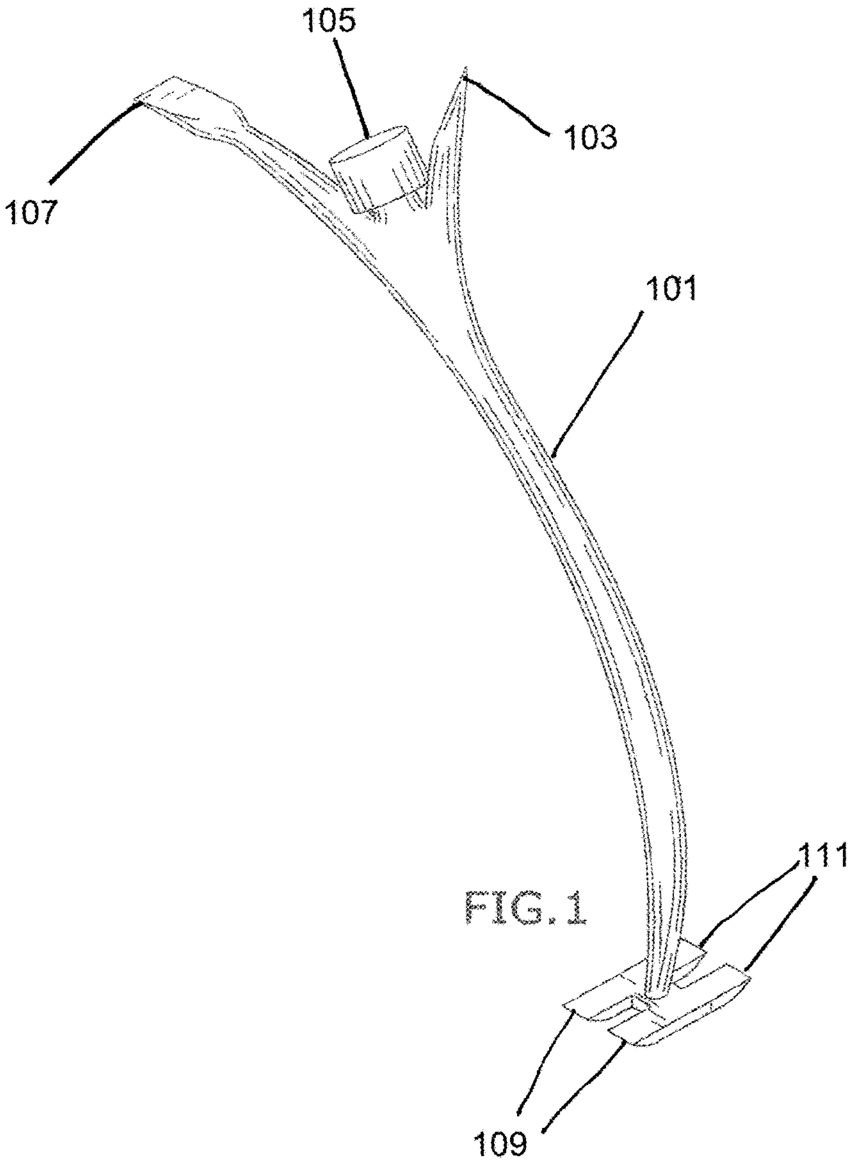
FIG. 1 is a top front perspective view of a locomotive brake service tool, showing my new more useful and improved original creation.
Figure 2:
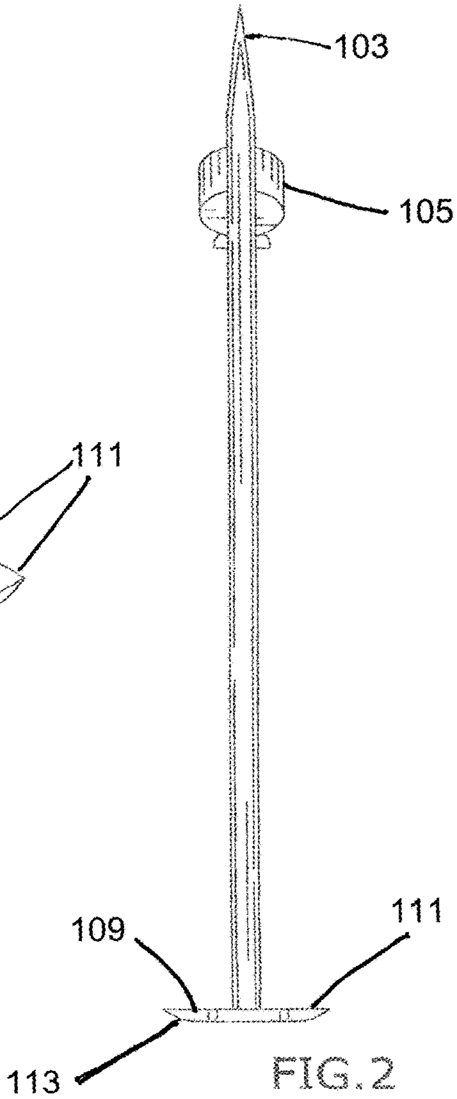
FIG. 2 is a right-side elevation view thereof.
Figure 3:
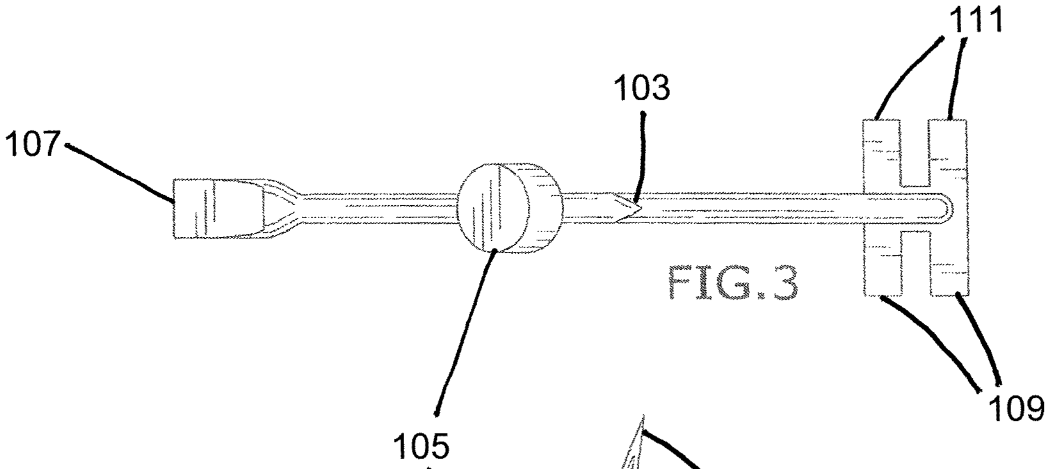
FIG. 3 is a top plan view thereof.
Figure 4:
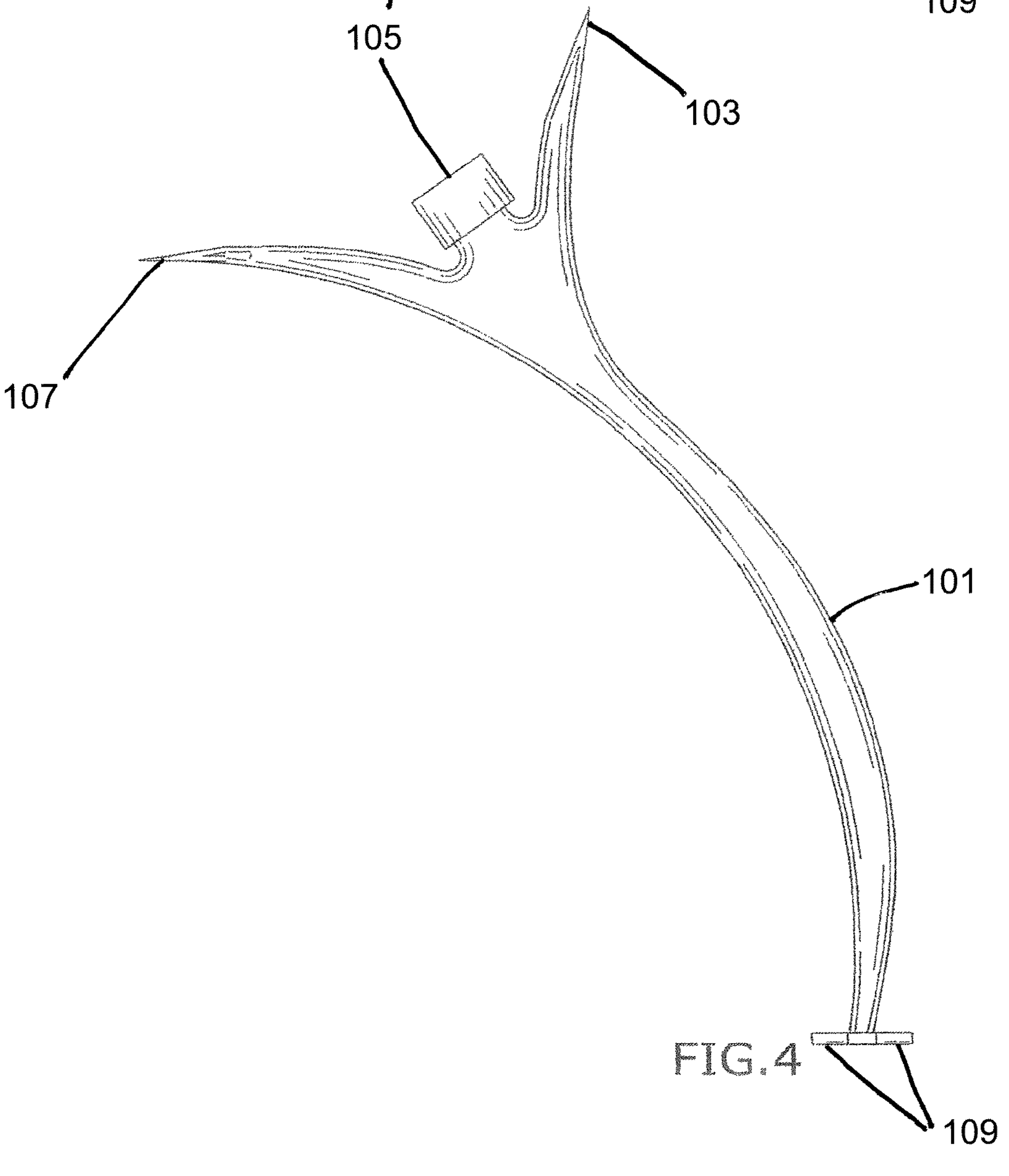
FIG. 4 is a front elevation view thereof, with the rear elevation view being a mirror image thereof.

In the following detailed description, it will reflect the elements of the CHANDLER 5 N 1 LOCOMOTIVE BRAKE SERVICE TOOL present application. This tool was created to specifically service and install brake shoes on locomotives by removing the brake pin retainer tab that secures a pin that maintains slack pressure on the brake pads from the slack adjuster. The tool has a double head brake pin removal foot that grabs the brake shoe retainer pin and allows the tool to pull the pin out of the brake shoe holder assembly, which allows the user to remove the worn-out brake shoe and install a new brake shoe in that precise brake shoe assembly.

There are eight- and twelve-wheel locomotives worldwide this tool will enable the new brake shoe retainer pin to be reinstalled to hold the brake shoe securely in the brake shoe holder assembly. Then the tool allows the user to tighten up the slack adjuster to put pressure on the shoes. Then the tool allows the pin retainer tab to be put back into position holding the pin in the slack adjuster rod assembly. The brake shoe replacement job is now finished, now the air valve can be turned back on at the brake assembly, so the engineer can now apply the brakes to the wheels from up in the cab. This is a new original creation utility, a locomotive brake service tool that is more useful and improved in changing brakes more effectively and less time consuming.

Railway systems are built in a variety gauges or track widths around the world with the standard gauge of 4 foot 8.5 inches being the predominant system. Rolling stock, such as locomotives and railcars, typically has a standard wheel diameter of 36 inches (920 mm). This standard wheel diameter has been defined by The International Union of Railways, with some rapid transit railway systems using smaller diameter wheels.

According to various teachings of the present disclosure, disclosed is a multi-purpose tool for replacing brake shoes having a handle member having left and right sides, and proximate and distal ends, an H-shaped member having a centroid, located at the distal end of the handle member, featuring two spaced apart tines forming a left fork and right fork, and a tri-tool assembly, located at the proximate end of the handle member, containing a prybar end, a centrally-located hammer head, and a punch, with the distal end of the handle member attached at the centroid of the H-shaped member.

In some embodiments, the handle member is curved, and in further instances, the handle member is curved to conform to the curvature of the radius of an installed brake shoe on a wheel of a standard gauge railcar. As set forth above, the diameter of a standard gauge railcar is 36 inches (920 mm).

The curved handle member which is connected to the centroid of H-shaped member at its distal end curves above a horizontal line bisecting the crossbar of the H-shaped member. This arrangement allows for unobstructed access to the opening of both of the left and right forks of the H-shaped member, and permits the disclosed device to used to remove brake shoe retainer pins.

The H-shaped member of the presently disclosed tool has a flat bottom portion with an angled portion connecting up to the top portion of the H-shaped assembly, and in preferred embodiments the angled portion comprises a 30 degree angle. This specific configuration facilitates removal of brake shoe retainer pins on both left and right wheels of a railcar truck. A pair of wheelsets are mounted in railcar truck.

As illustrated in the Figures, the H-shaped assembly has four tines, in two pairs, that are spaced apart by the diameter of a brake shoe retainer pin.

Also taught by the present disclosure is a method of removing and replacing a brake shoe of a railcar, the method requires an installation tool for removing and replacing railcar brake shoes. The installation tool includes a handle member having left and right sides, and proximate and distal ends, an H-shaped member having a centroid, located at the distal end of the handle member, comprising two spaced apart tines forming a left fork and right fork, and a tri-tool assembly, located at the proximate end of the handle member, comprising a prybar end, a centrally-located hammer head, and a punch, with the distal end of the handle member attached at the centroid of the H-shaped member. The method includes the steps of activating an air release handle to remove the air pressure from a set of locomotive wheels, obtaining the above-described installation tool, and then pushing the brake shoe away from the locomotive wheel with the prybar end, lifting a slack adjuster retainer clip with the prybar end, and knocking a slack adjuster pin out of a slack adjuster rod with the hammer head. Next step is grabbing a metal head of a brake shoe retainer pin with the one fork of the tool, pulling brake shoe retainer pin out of the brake shoe retainer slot, and releasing and removing an old brake shoe. Then the replacing portion of the method starts with installing a new brake shoe in the brake shoe retainer slot, pushing the brake shoe retainer pin back through the brake shoe retainer holes, taking up the slack in a slack adjuster by inserting the punch in an outer slack adjuster hole, applying pressure, and aligning the hole in the slack adjuster, knocking a slack adjuster hole pin back in with the hammer head, and pushing the retainer clip back in place with the prybar end. Thus, a first worn brake shoe is replaced with the method and tool disclosed in the present application.

The work continues with the step of proceeding to a next set of brake shoes, removing and replacing the brake shoes as needed, and continuing on until all the necessary brake shoes are removed and replaced.

As presented in the attached Figures, one possible embodiment of the presently disclosed device is the multi-purpose tool of FIG. 1 featuring a handle member 101 having left and right sides, and proximate and distal ends, with an H-shaped member having a centroid, located at the distal end of the handle member, comprising two spaced apart tines forming a left fork 109 and right fork 111, and located at the proximate end of the handle member, a tri-tool assembly, which includes a prybar end 107, a centrally-located hammer head 105, and a punch 103.

In some embodiments of the present teachings, the H-shaped member has a flat bottom surface that connects to the top surface with angled sides 113 with angles of about 30 degrees.

According to several embodiments of the disclosed device, the overall length of the device as measured from the end of the tines on the left fork 109 to the tip of the punch 103 is about 19 inches (482 mm), and the distance between the right fork 111 to the tip of the prybar end 107 is about 18 inches (457 mm). The width at the proximate end as measured between the tip of the punch to the tip of the prybar end is about 9 inches (229 mm).

The H-shaped assembly at the distal end of the handle according to various embodiments of the present teachings measures 3 inches (76.2 mm) by 1.75 inches (44.4 mm) with an opening of 0.625 inches (16 mm) between the tines on the short side of the H-shaped assembly. On the proximate end, the prybar end measures 4.75 inches (120 mm) from the center of the hammer head which measures 1.5 inches (38 mm) in diameter while the punch is 4.25 inches (229 mm) in length.

Although the foregoing description is directed to the preferred embodiments of the present teachings, it is noted that other variations and modifications will be apparent to those skilled in the art, and which may be made without departing from the spirit or scope of the present teachings. The provided figures are not to scale, and the angles between various members of the apparatus are merely illustrative.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

The invention claimed is:

1. A multi-purpose tool for replacing brake shoes, comprising a handle member having left and right sides, and proximate and distal ends;

an H-shaped member comprising a left fork, a right fork, and a centroid, the centroid located at the distal end of the handle member, wherein the left fork and the right fork each comprise two spaced apart tines, and a tri-tool assembly, located at the proximate end of the handle member, comprising a prybar end, a centrally-located hammer head, and a punch, wherein the distal end of the handle member is attached at the centroid of the H-shaped member.

2. The multi-purpose tool according to claim 1, wherein the handle member is curved.

3. The multi-purpose tool according to claim 2, wherein the handle member is curved to conform to the curvature of the radius of an installed brake shoe on a wheel of a standard gauge railcar.

4. The multi-purpose tool according to claim 1, wherein the handle member curves above a horizontal line bisecting a crossbar of the H-shaped member.

5. The multi-purpose tool according to claim 1, wherein the H-shaped member comprises a flat bottom portion with an angled side connecting up to the top portion of the H-shaped assembly.

6. The multi-purpose tool according to claim 5, wherein the angled side comprises a 30 degree angle.

7. The multi-purpose tool according to claim 1, wherein the tines of the left fork and the tines of the right fork are each spaced apart from one another by the diameter of a brake shoe retainer pin.

8. A method of removing and replacing a brake shoe of a railcar, comprising activating an air release handle to remove the air pressure from a set of locomotive wheels;

obtaining an installation tool for removing and replacing railcar brake shoes, the installation tool comprising:

a handle member having left and right sides, and proximate and distal ends;

an H-shaped member comprising a left fork, a right fork, and a centroid, the centroid located at the distal end of the handle member, wherein the left fork and the right fork each comprise two spaced apart tines, and a tri-tool assembly, located at the proximate end of the handle member, comprising a prybar end, a centrally-located hammer head, and a punch, wherein the distal end of the handle member is attached at the centroid of the H-shaped member;

pushing the brake shoe away from the locomotive wheel with the prybar end;

lifting a slack adjuster retainer clip with the prybar end;

knocking a slack adjuster pin out of a slack adjuster rod with the hammer head;

grabbing a metal head of a brake shoe retainer pin with the one fork of the tool;

pulling brake shoe retainer pin out of the brake shoe retainer slot;

releasing and removing an old brake shoe;

installing a new brake shoe in the brake shoe retainer slot;

pushing the brake shoe retainer pin back through the brake shoe retainer holes;

taking up the slack in a slack adjuster by inserting the punch in an outer slack adjuster hole, applying pressure, and aligning the hole in the slack adjuster;

knocking a slack adjuster hole pin back in with the hammer head, and pushing the retainer clip back in place with the prybar end.

9. The method according to claim 8, further comprising proceeding to a next set of brake shoes;

removing and replacing the brake shoes as needed, and continuing on until all the necessary brake shoes are removed and replaced.

10. A multi-purpose tool for replacing brake shoes on a railroad car, comprising an H-shaped member;

a handle member, and a tri-tool assembly, wherein the H-shaped member comprising a left fork, a right fork, and a centroid, the centroid connected to a first end of the handle member, wherein the left fork and the right fork each comprise two spaced apart tines, and the tri-tool assembly connected at a second end of the handle member comprises a prybar end, a centrally-located hammer head, and a punch.

* * * * *